(12) United States Patent
Wilke et al.

(10) Patent No.: US 6,202,961 B1
(45) Date of Patent: Mar. 20, 2001

(54) PASSIVE, MULTI-AXIS, HIGHLY DAMPED, SHOCK ISOLATION MOUNTS FOR SPACECRAFT

(75) Inventors: Paul S. Wilke, San Jose; Conor D. Johnson, Belmont; Scott C. Pendleton, Foster City, all of CA (US)

(73) Assignee: CSA Engineering, Mountain View, CA (US)

( * ) Notice: Subject to any disclaimer, the term of this patent is extended or adjusted under 35 U.S.C. 154(b) by 0 days.

(21) Appl. No.: 09/531,810

(22) Filed: Mar. 21, 2000

(51) Int. Cl.[7] .................................................. B64G 1/00

(52) U.S. Cl. .................. 244/158 R; 188/378; 244/118.1; 267/151

(58) Field of Search .......................... 244/118.1, 158 R; 248/63 C, 603, 604, 634, 632; 267/148, 151, 162, 279, 154, 141.1, 141.3, 141.2, 140.5, 136; 188/378–380

(56) References Cited

U.S. PATENT DOCUMENTS

| | | |
|---|---|---|
| 5,305,981 | 4/1994 | Cunningham et al. . |
| 5,878,980 | 3/1999 | Cooley, Jr. . |
| 5,890,569 | 4/1999 | Goestert . |
| 5,961,078 | 10/1999 | Edberg et al. . |
| 6,012,680 | 1/2000 | Edberg et al. . |

Primary Examiner—Galen L. Barefoot
(74) Attorney, Agent, or Firm—Rick G. Brewster

(57) ABSTRACT

A passive, multi-axis, highly damped, shock load isolation mount which can serve as a complete one-piece mount, particularly of a spacecraft to its launch vehicle or launch vehicle adaptor structure, or can serve in multiplicity as necessary to provide a complete shock load isolation mounting system. When used as a one-piece mount or used in multitude as a system, the invention provides substantial reduction in the shock load transmission to a payload from its support base for both axial loads and lateral loads. The unique multi-layered, opposed beam, contorted load path flexure design combined with a shear wall type constrained layer damping treatment provides substantial shock load isolation in a durable, reliable, lightweight, and compact form.

14 Claims, 11 Drawing Sheets

PASSIVE, MULTI-AXIS, HIGHLY DAMPED, SHOCK ISOLATION MOUNTS FOR SPACECRAFT

STATEMENT REGARDING FEDERALLY SPONSORED RESEARCH OR DEVELOPMENT

This invention was made with U.S. Government support under SBIR Contract No. F-29601-96-C-0107 awarded by the Department of the Air Force. The U.S. Government has certain royalty-free rights in this invention.

BACKGROUND OF THE INVENTION

The present invention relates to passive shock load isolation apparatus suitable for use on spacecraft launch systems.

Spacecraft launch systems present severe requirements for shock load isolation apparatus. Shock loads are typically large magnitude disturbances having vibration energy at 100 Hz and above and can be of a transient or continuing nature, and can have both spacecraft axial and lateral directional components. During launch and during spacecraft separation from the launch vehicle, substantial shock load vibration energy is transmitted from the launch vehicle to the more delicate spacecraft. This loads environment drives up the size and strength requirements of the spacecraft and spacecraft-to-launch vehicle interface hardware. In the development of shock load isolation apparatus, as with any space-flight hardware, the mass and space requirements of the apparatus must be aggressively minimized so to reduce the cascading design impact to supporting hardware and thereby reduce the associated additional development and launch costs. Additionally, the overall system dynamics of the spacecraft and launch vehicle system must be predictable and carefully controlled in design so to allow controlled and stable flight. With the desire to launch a wide array of payloads comes the need for shock load isolation apparatus that can be easily scaled up or down to accept the broadly ranging size and mass of the spacecraft structures. And perhaps most importantly, the high costs and lengthy development times associated with satellites and other space bound hardware require that a premium be placed on obtaining durable and reliable spacecraft mounting hardware. Because the shock isolation mount, to be effective, must be the only connection of the spacecraft to the launch vehicle, it must meet these demands of high durability and reliability in concert with its shock isolation characteristics.

One described spacecraft axial vibration isolator is disclosed in U.S. Pat. No. 5,961,078. This patent claims that a payload attachment interface ring can be utilized to add axial compliance to the payload and launch vehicle interface by staggering the attachment points of the payload relative to the attachment points of the interface ring to the launch vehicle. This patent also suggests that damping can be added to the inherent damping of the payload attachment interface ring by making the ring a laminate which includes a 'yieldable material to provide inherent hysteresis qualities'. The reality and deficiency of this concept for shock load isolation is that little additional axial compliance and deflection can be added without encountering stress failures in the payload attachment interface ring. The compliance gained is a simple addition of the beam bending and beam torsion compliances of the payload interface ring induced by staggering the payload attachment points relative to the base structure support pads. More importantly, the damping available within this concept from the bending and torsion of the interface ring material is commonly quite small, and provides relatively little damping to shock loads. Also, since the deflections of the interface ring are limited by the failure stress limits of the interface ring's load carrying material, the additional damping possible by making the ring a laminate including a yieldable material is severely limited. The more substantial axial compliance and damping characteristics necessary for effective shock load isolation may have been part of the 'specially designed flexure feature' referred to in this patent's description, but it is neither described nor claimed.

A lateral force vibration isolator is claimed in U.S. Pat. No. 6,012,680. This patent discloses a concept of a payload attachment structure incorporating a circular array of beam flexures arranged to allow lateral compliance between the payload and supporting base. This concept provides no significant axial compliance nor damping necessary for isolation of the payload from axial shock loads.

U.S. Pat. No. 5,878,980 discloses a device where, to achieve sufficient damping, an elastomer is utilized in the primary load path within the mount of the spacecraft to the launch vehicle. This approach for obtaining damping has been commonly employed in the vibration isolation field, but it results in a mount with the distinct disadvantage of having a significantly lower strength and reduced fatigue life relative to the invention disclosed, which provides high damping but with a complete high strength material load path. The insertion of the elastomer into the primary load path in U.S. Pat. No. 5,878,980 also results in a mount with nonlinear load deflection behavior which complicates the design process and reduces the dynamic performance predictability of the launch system.

BRIEF SUMMARY OF THE INVENTION

The invention described within is a passive, multi-axis, highly damped, shock load isolation mount which can serve as a complete one-piece mount, particularly of a spacecraft to its launch vehicle or launch vehicle adaptor structure, or can serve in multiplicity as necessary to provide a complete shock load isolation mounting system. It provides substantial reduction in shock load transmission from support base to payload for both axial loads and lateral loads, as can be seen in response spectra charts of test data in FIGS. 9 and 10, and does so in a package that's simple, light-weight and compact.

The assembled device is of one-piece, typically cylindrical ring construction and is essentially a cylindrically shaped flexure body encased on its outer and/or inner cylindrical surfaces by a viscoelastic material (VEM) layer and a stiff constraining layer. The payload attaches to one end of the cylindrical flexure body and the launch vehicle or support base attaches to the other end of the cylindrical flexure body.

The cylindrical flexure body is of novel design and is comprised of a multitude of layered rings of beam flexures wherein ideally a staggered pattern of closely nested beam flexures having opposed beam bending deflection is effected. These beam flexures can be created by simple material removal from a cylindrical tube or by the assembly of multiple rings with appropriately spaced standoff posts. The standoff posts of one ring of beam flexures acts as the load application points to the next ring of beam flexures, and the resulting nesting of beam flexures allows significant compliance to be developed within the overall flexure body without overstraining any one flexure. The low mounting compliance necessary to effect the desired vibration isolation frequency for the spacecraft is thereby achieved.

Additionally, the alternating position of the standoff posts between rings of beam flexures within the mount is designed to create a contorted and lengthy load path between vehicle and spacecraft which significantly impedes the transfer of high frequency shock energy. FIG. 9 shows the substantial reduction of transferred axial shock load between 500 Hz to 10,000 Hz by use of the invention. FIG. 11 shows the time history of the axial transient acceleration response of a payload relative to its base by use of the invention. FIGS. 10 and 12 show corresponding plots of the invention for the concomitant reduction of lateral shock loads.

An additional novel aspect of the invention is the orientation of the constrained VEM layer relative to the beam flexures. The VEM and constraining layers, rather than laying on the top of the flexure and being forced to bend with the flexure, are affixed to and across the sides of the beam bending flexures in the manner of a shear wall and thereby oppose the relative translational motion between beam flexures. (See FIG. 3 for a cross section of the isolation mount, which shows this physical relationship of the VEM and constraining layers relative to the beam flexures.) The relative translational bending movement of the opposed flexures, even though minor, induces significant shear into the constrained VEM layer. The multitude of flexures moving relative to one another amplifies the amount of shearing distortion of the VEM layer and results in a correspondingly large amount of damping. With constrained VEM applied to the outer surface of the cylindrical flexure body alone, critical damping percentages of up to 12% are easily achieved. A substantial additional increase in damping can be obtained by simply applying a constrained VEM layer to the inner surface of the flexure body as well.

The short profile of the assembled isolation mount provides inherently greater lateral stiffness than other systems with relatively long struts and/or viscous dampers, thereby avoiding any substantial lowering of spacecraft lateral rocking mode frequencies, and resulting in reduced relative lateral motion between the spacecraft and fairings. Spacecraft-to-fairing clearances need not be appreciably increased, if at all, with the use of this shock isolation mount.

The complete high-strength material load path (such as that obtained with aluminum, titanium or steel) through the cylindrical flexure body provides a more durable and reliable means for connecting the spacecraft and launch vehicle than that available in systems of the prior art having a lower-strength elastomer or other easily yieldable material within the load path. Additionally, linear load-versus-deflection behavior characteristics are achieved, thus providing for more straightforward and predictable dynamic characteristics than available with those systems of the prior art utilizing elastomers in the load path.

The concept easily adapts to various sized payloads. The cylindrical flexure body can be made large enough in diameter to match the spacecraft-to-launch vehicle attachment flange and thus, when assembled with its VEM and constraining layers, provide for a complete, one-piece, shock load isolation mount for the spacecraft, or multiple units of smaller diameter may be employed in a support system. Any type of polygonal shape may be employed rather than the cylindrical shape described if it should better suit the mounting of the payload. Discrete wall flexure sections could also be utilized with attached VEM and constraining layers if a complete polygon ring flexure was unnecessary or prevented by hardware clearance limitations.

DETAILED DESCRIPTION OF THE INVENTION

Figure 1:
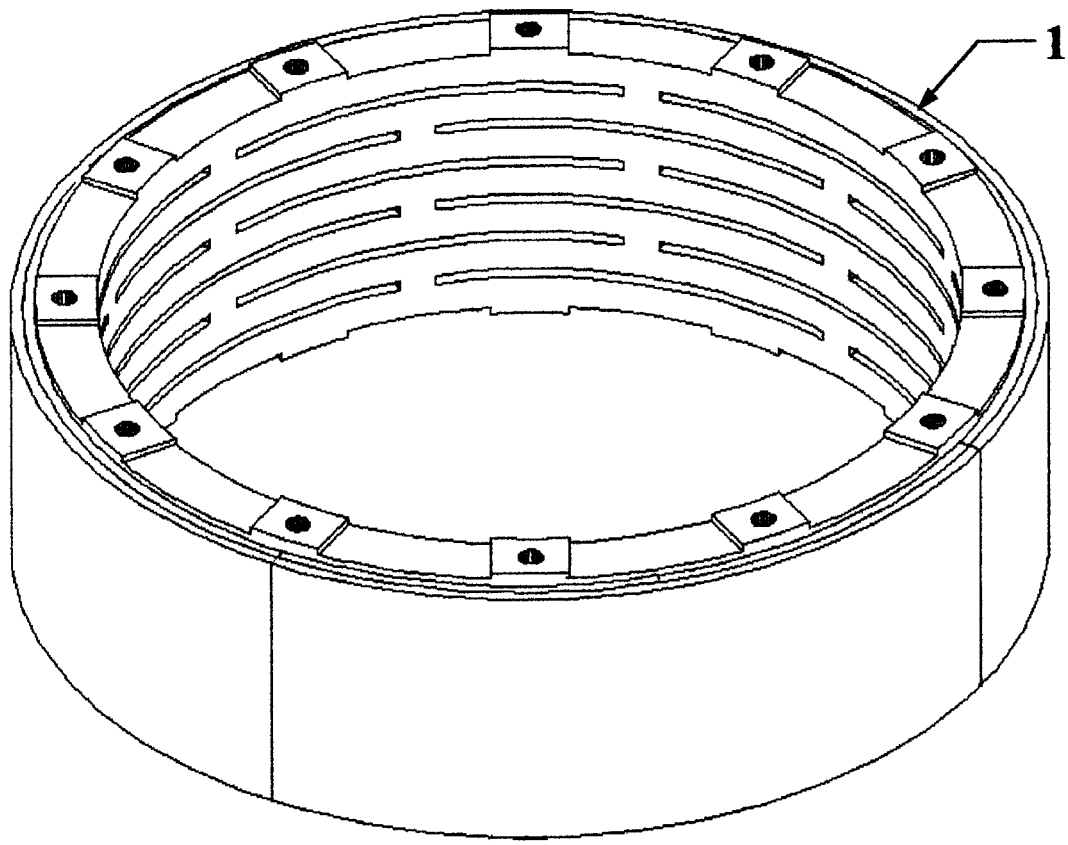
FIG. 1 is an isometric view of the one-piece assembled, passive, multi-axis, highly damped, shock isolation mount.
Figure 2:
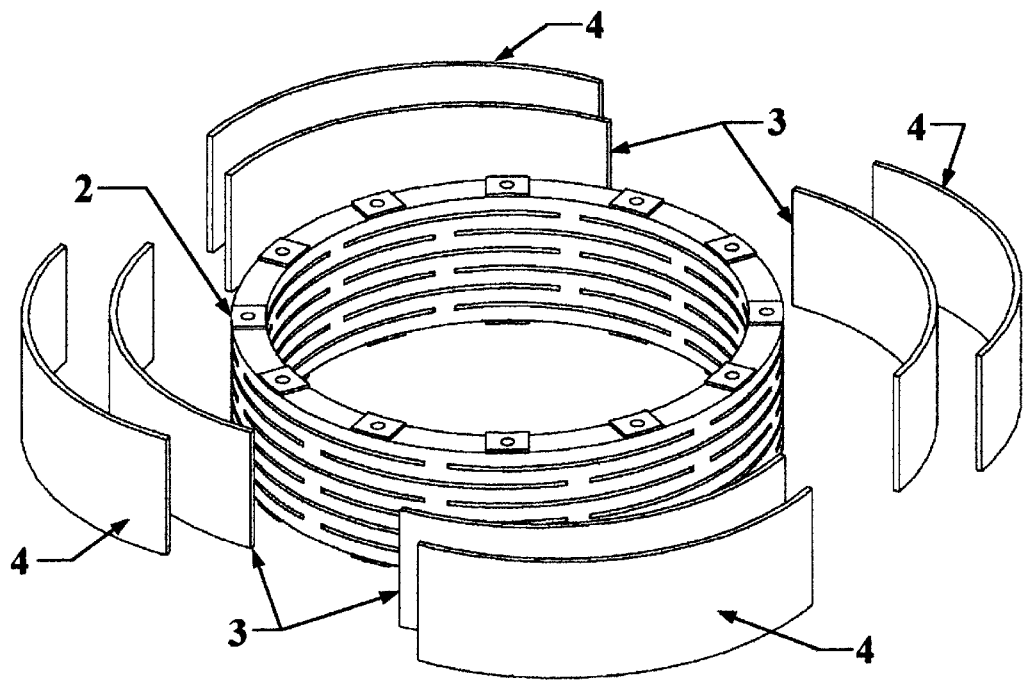
FIG. 2 is an exploded view of the shock isolation mount.
Figure 3:
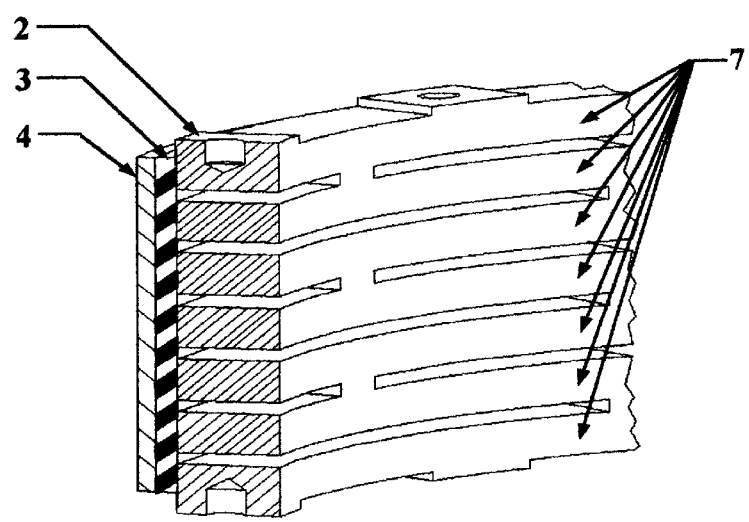
FIG. 3 is a cutout view which shows the longitudinal cross section of the shock isolation mount and the shear wall type of relationship of the viscoelastic and constraining layers to the multiple layered beam flexures.

A preferred embodiment of the invention is a one-piece assembled ring 1 in FIG. 1. Referring to the exploded view in FIG. 2, the one-piece assembled ring 1 is comprised of a cylindrical flexure body 2 encompassed on its outer cylindrical surface by cylindrical segments of viscoelastic material 3 which have attached to them comparably shaped cylindrical segments of a stiff constraining layer material 4. In FIG. 3 the shear wall type of relationship of the viscoelastic material layer 3 and constraining layer 4 relative to the flexure body 2 and its multiple layered rings of beam flexures 7 is shown.

Figure 4:
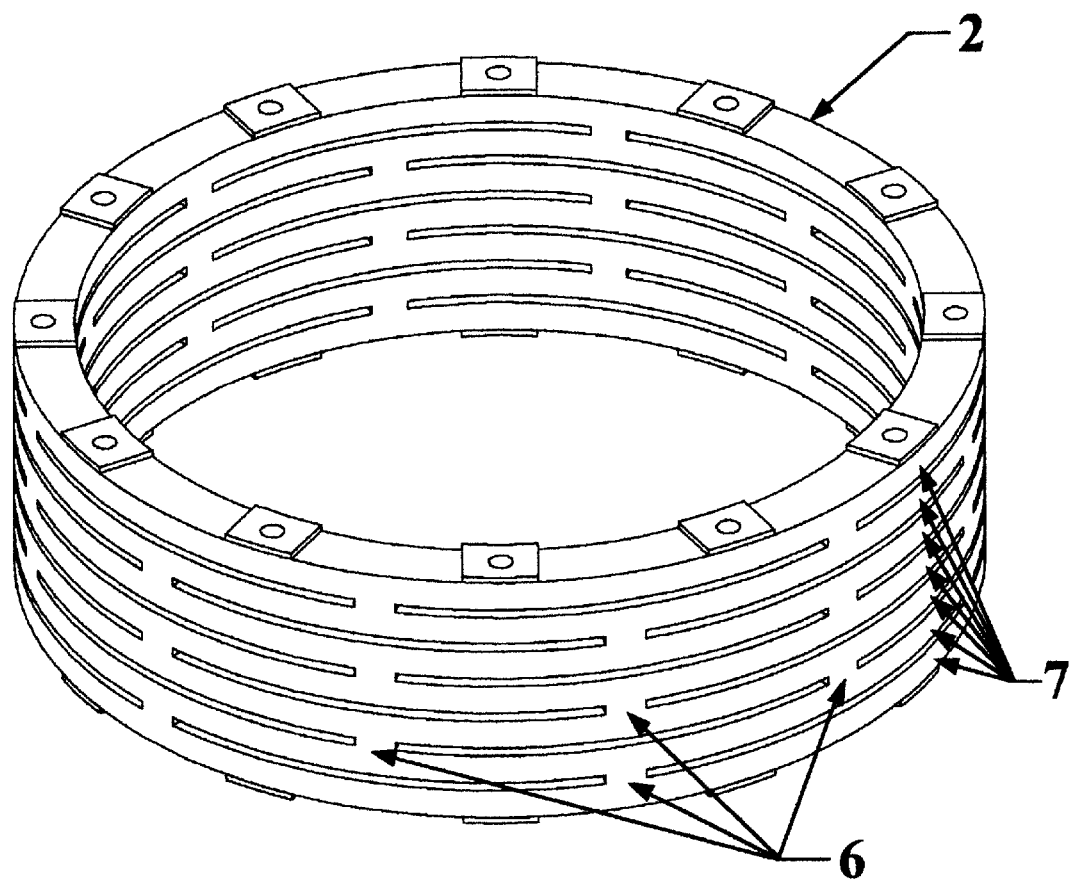
FIG. 4 is an isometric view of the cylindrical flexure body of the type formed from a single piece of material FIGS. 5a and 5b contain the top and front orthogonal views of the cylindrical flexure body, respectively, of the type formed from a single piece of material.
Figure 5A:
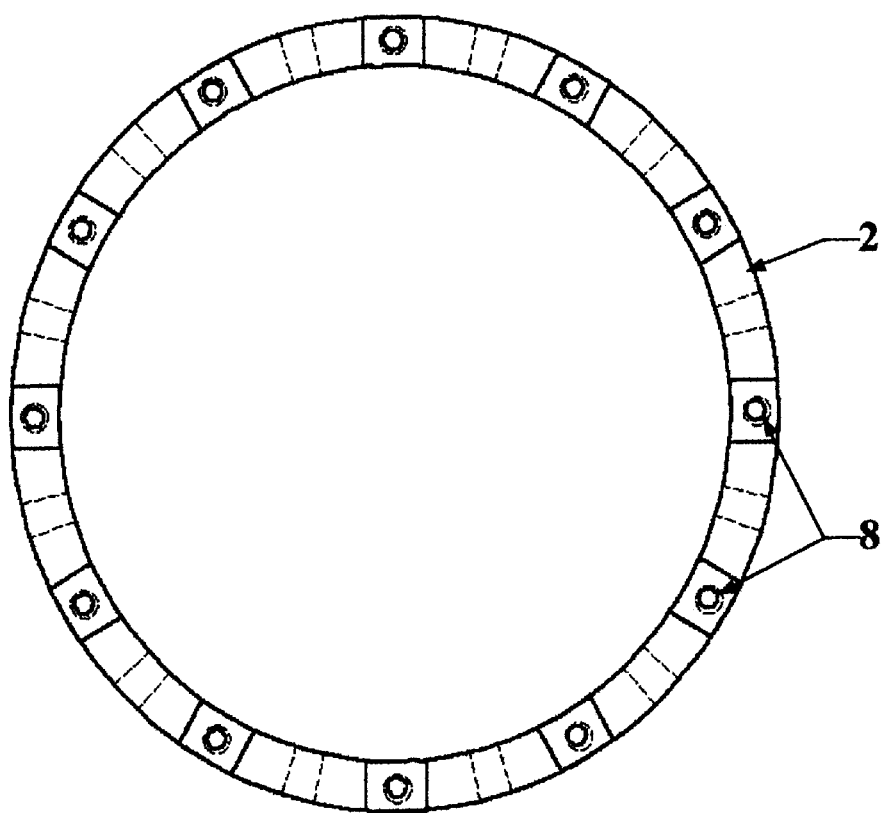
Figure 5B:
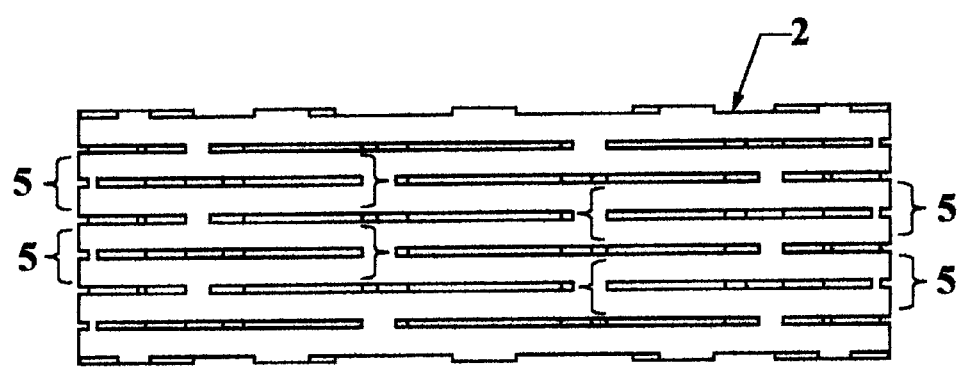
Figure 6:
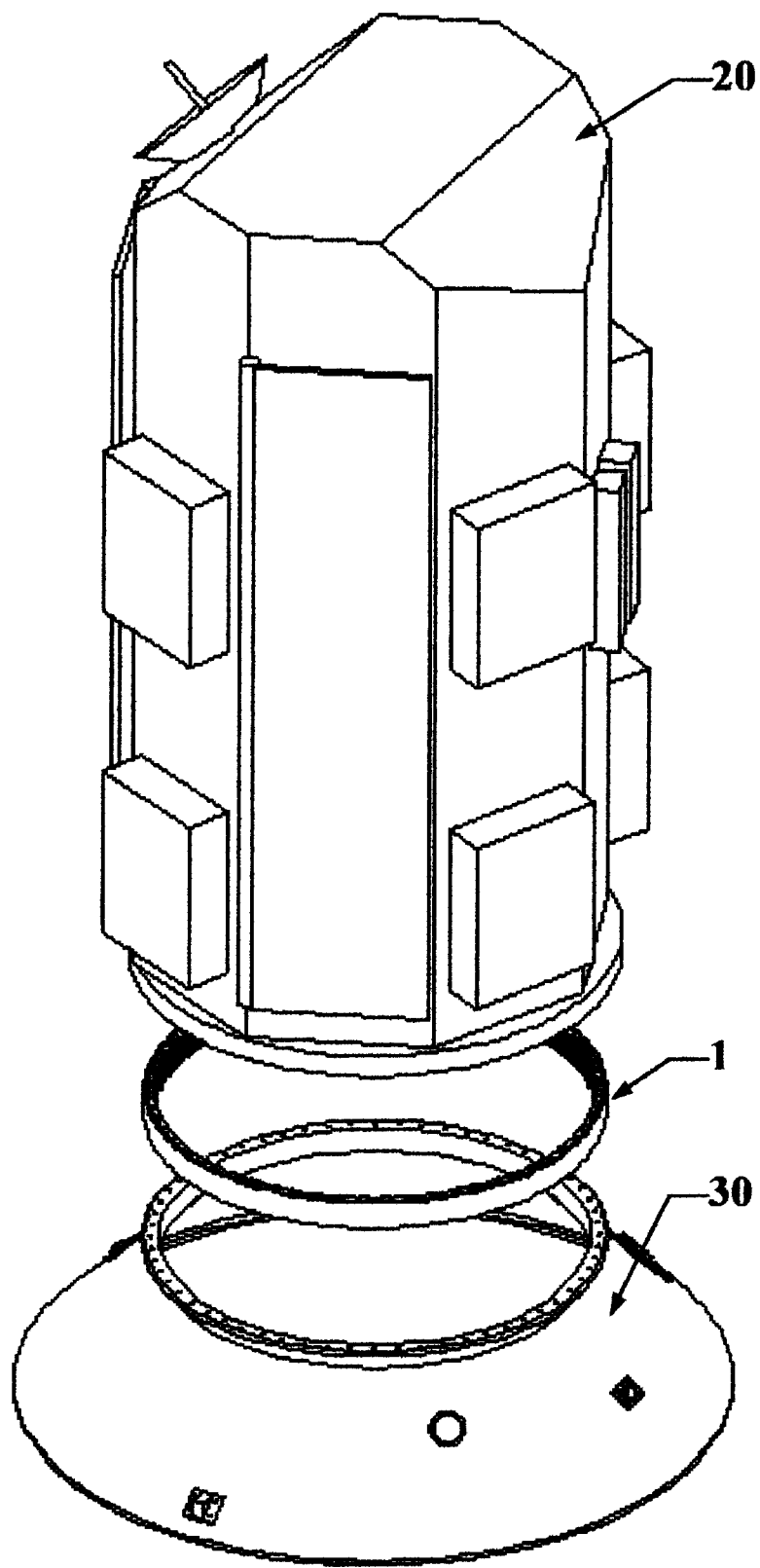
FIG. 6 contains an exploded view of the upper portion of the launch vehicle system, showing the relationship of the one-piece assembled, passive, multi-axis, highly damped, shock isolation mount relative to the spacecraft and launch vehicle adaptor cone.
Figure 7:
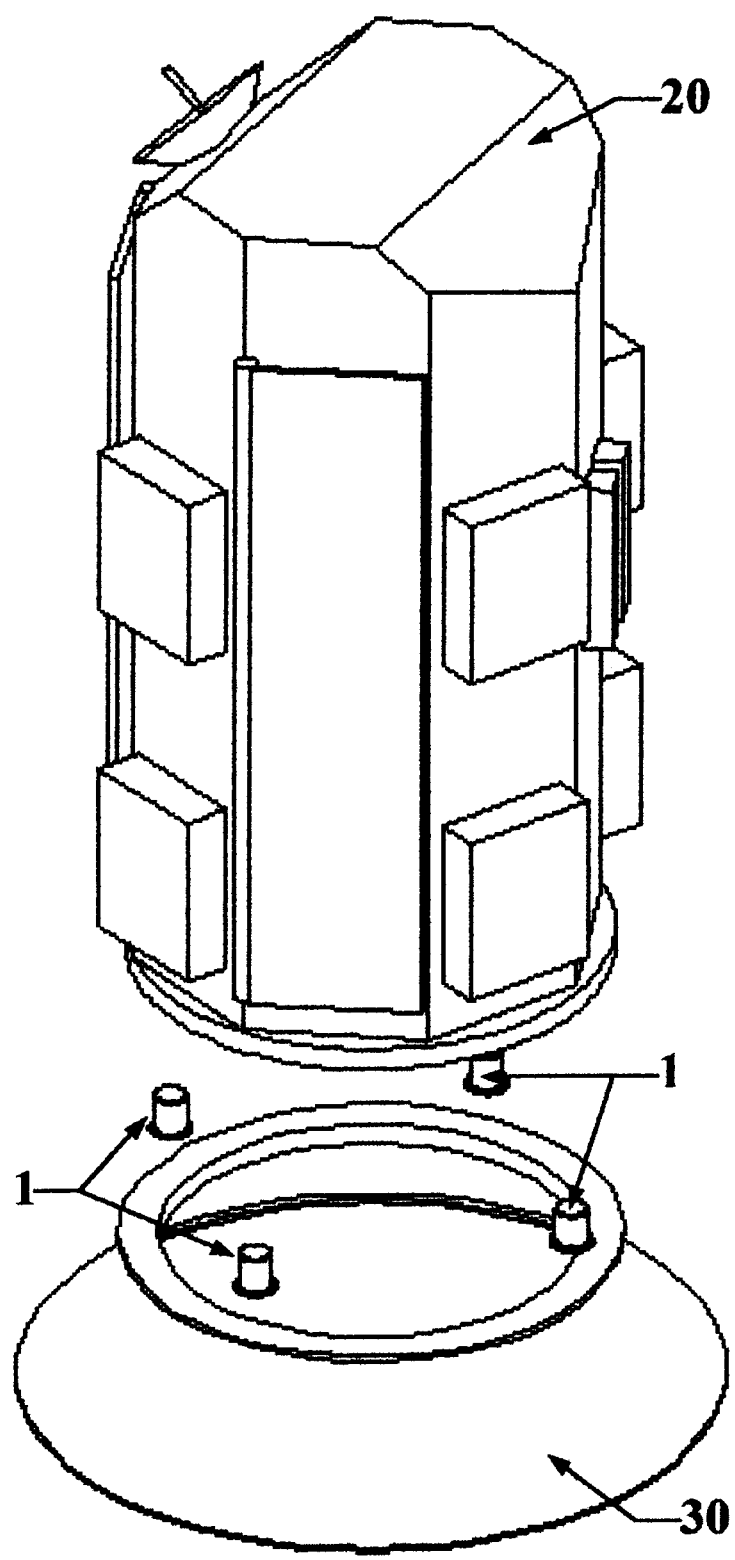
FIG. 7 contains an exploded view of the upper portion of the launch vehicle system, where multiple, passive, multi-axis, highly damped, shock isolation mounts are used in a shock isolation system to mount the spacecraft to the launch vehicle adaptor cone.

The cylindrical flexure body 2 in one of its preferred forms, as shown in isometric view in FIG. 4, is of the type formed from a single piece of high strength, linear elastic material, and in this configuration has its multiple layered rings of beam flexures 7 connected to one another in a continuous manner at standoff posts 6. The low profile of the flexure body 2 as seen in FIG. 5b minimizes the impact to the overall launch vehicle length. The flexure body 2 as shown in FIG. 5a also has coaxially aligned fastener holes 8 provided at both the top and bottom surfaces with a bolt circle diameter and spacing that allows the one-piece assembled ring 1 to be directly inserted at the interface of existing spacecraft and launch vehicle combinations as shown in FIG. 6. In this configuration shown in FIG. 6, the one-piece assembled ring 1 acts as the complete mount for the spacecraft 20, thus providing complete shock load isolation from the launch vehicle or launch vehicle adaptor structure 30. The diameter of the flexure body 2 and resulting one-piece assembled mount 1 can be made smaller so to provide discrete isolation mounts which can be used in an isolation mounting system as shown in FIG. 7. In this figure, several isolation mounts 1 serve to attach the spacecraft 20 to the launch vehicle 30.

The cylindrical flexure body 2, in the form shown in FIGS. 4 and 5a and 5b, has its rings of beam flexures 7 supported relative to one another by standoff posts 6 in such a fashion that any two neighboring rings 7 forms a ring of opposed beam flexures 5. The spacing of the standoff posts 6 between rings 7 determines the number and length of the opposed beam flexures 5 created, and the resulting flexure beam count and cross section and overall flexure body diameter determine the effective overall stiffness of the mount. The preferred placement of the standoff posts 6 is such that they alternate from their position between a first and second ring 7 to a position for the second and third rings 7 that is clocked to midway between the position of the standoff posts 6 associated with the first and second rings 7, and then the standoff posts 6 locations are clocked back for the third and fourth rings 7, and so on for each of the remaining rings 7.

Figure 8A:
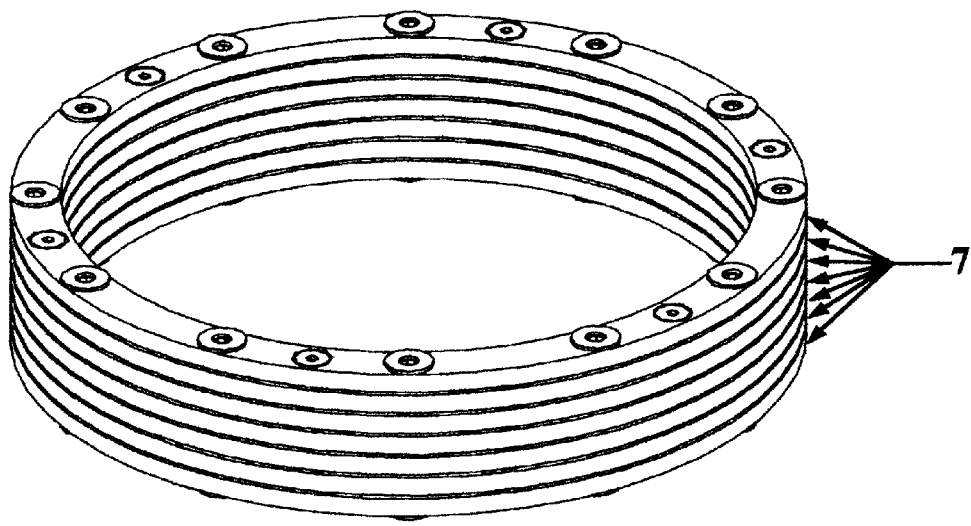
FIG. 8a is an isometric view of one variation of the cylindrical flexure body wherein the body is an assembly of a multitude of rings and standoff posts, and wherein the standoff posts consist of a combination of spacer washers and fasteners.
Figure 8B:
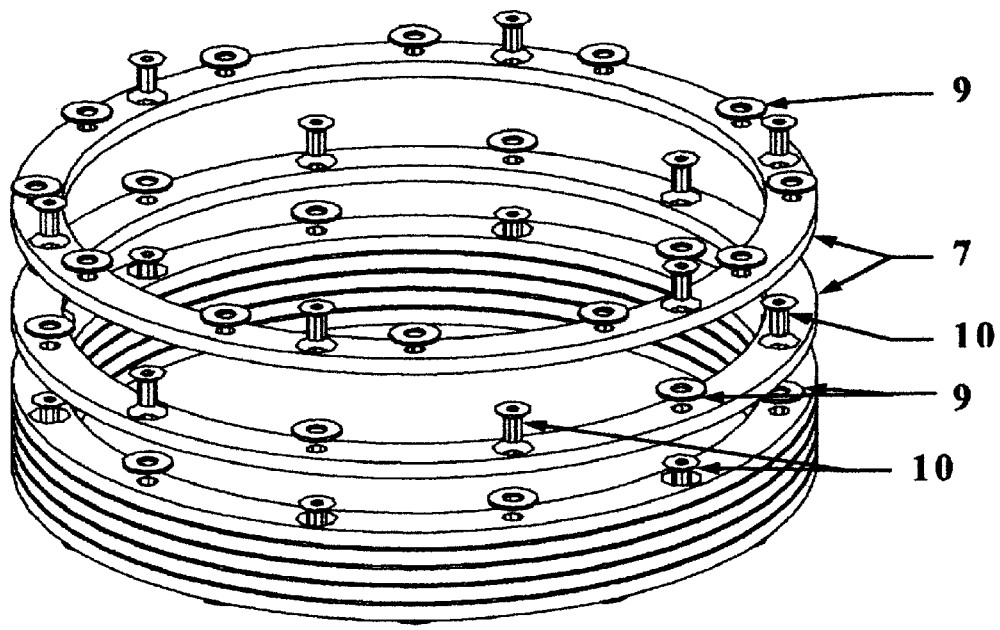
FIG. 8b is an exploded view of the cylindrical flexure body wherein the body is an assembly of a multitude of rings and standoff posts, and wherein the standoff posts consist of a combination of spacer washers and fasteners.
Figure 9:
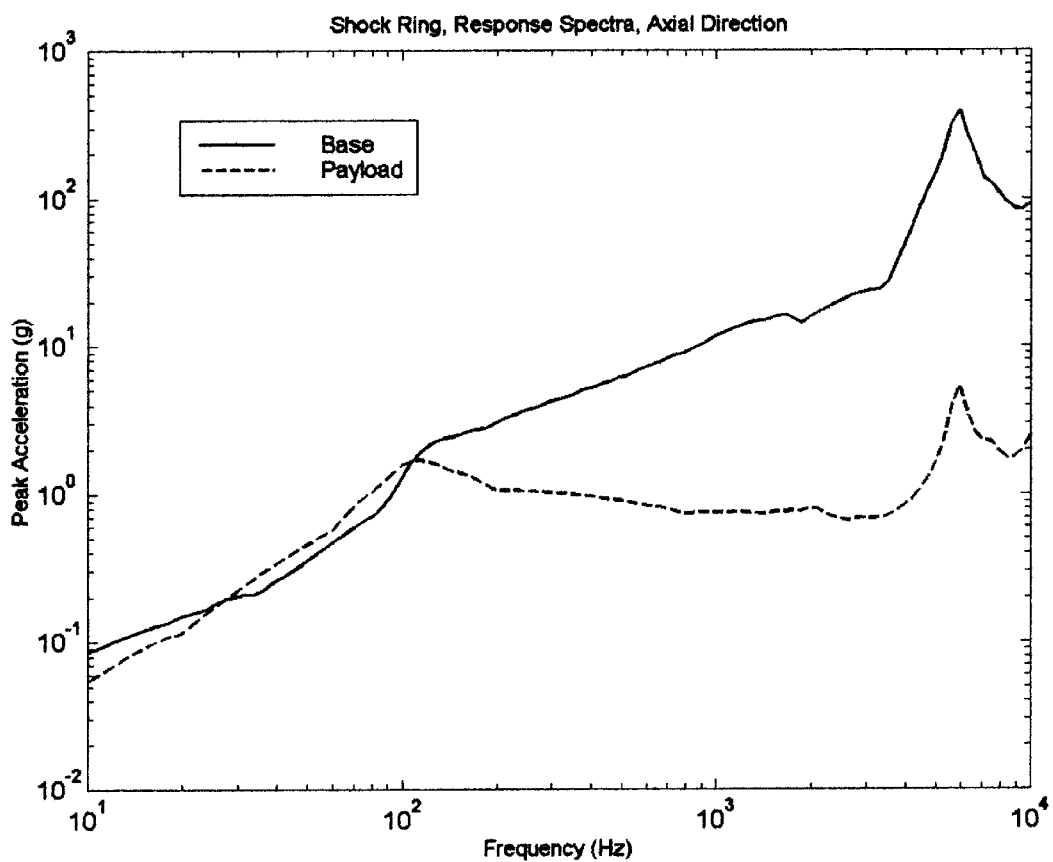
FIG. 9 is a graph showing the achieved axial shock load response spectra across one particular configuration of the shock isolation mount.
Figure 10:
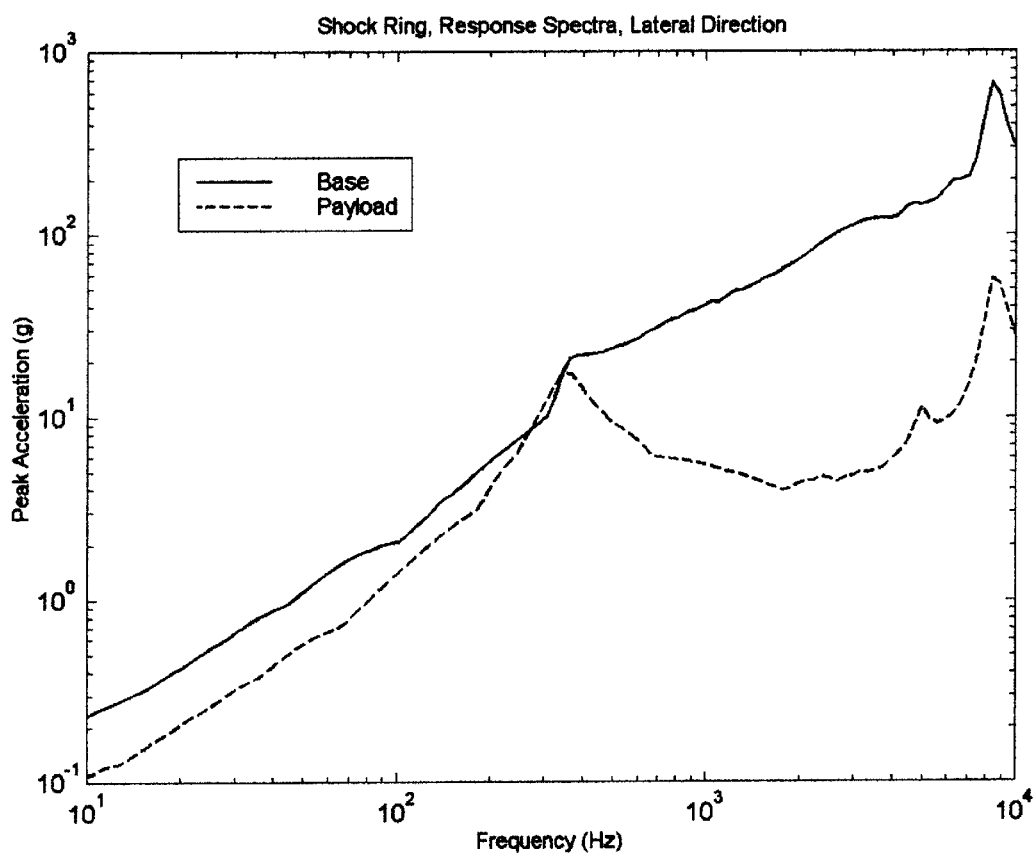
FIG. 10 is a graph showing the achieved lateral shock load response spectra across the same shock isolation mount configuration as that reported in FIG. 9.
Figure 11:
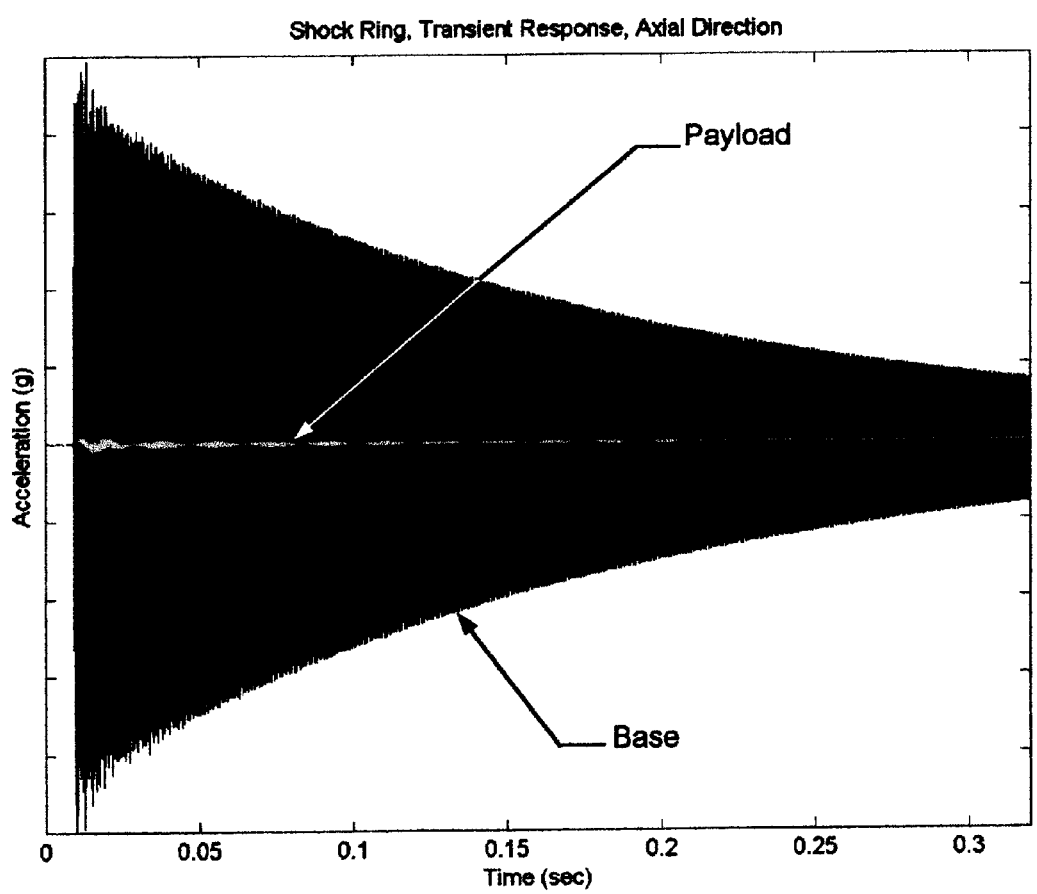
FIG. 11 is a graph of the transient axial acceleration response time history of the same payload and shock isolation mount configuration as that reported in FIG. 9.
Figure 12:
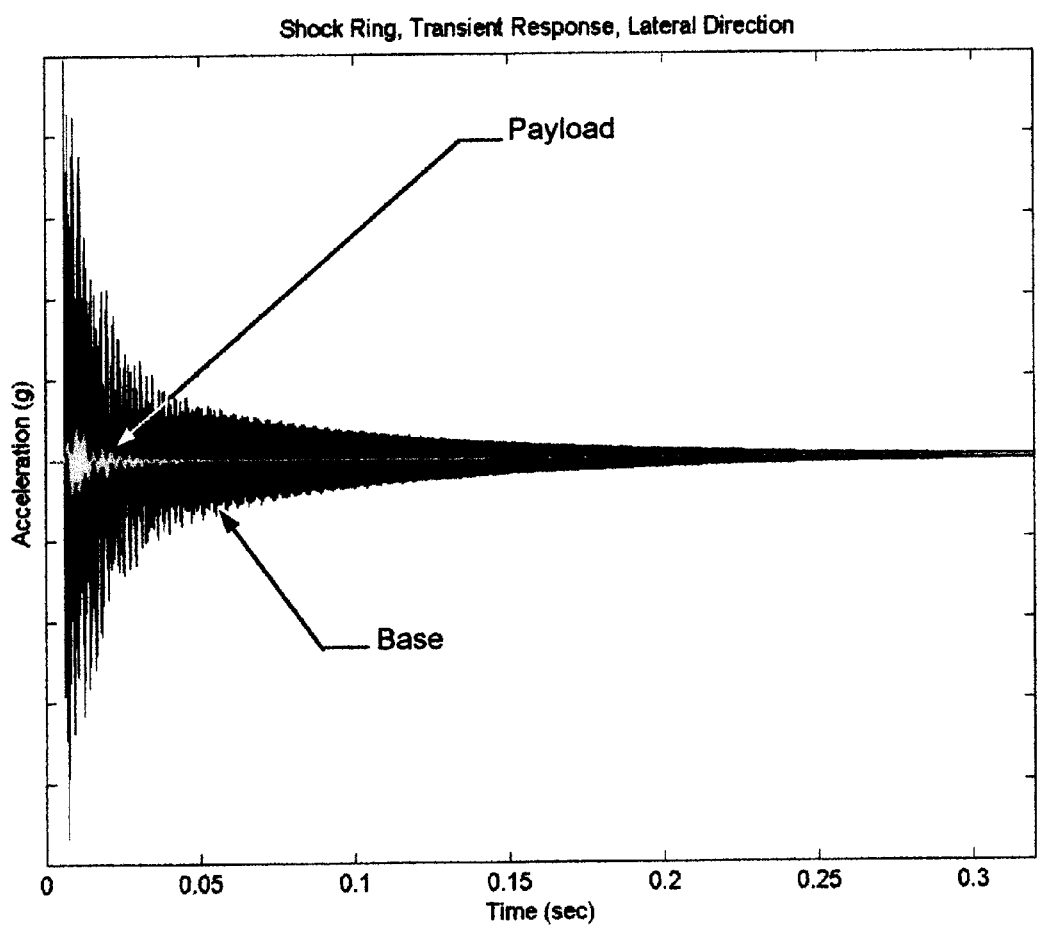
FIG. 12 is a graph of the transient lateral acceleration response time history of the same payload and shock isolation mount configuration as that reported in FIG. 9.

An alternate form of the flexure body 2 is one where the multiple beam flexure rings 7 are assembled to one another as shown in FIGS. 8a and 8b, rather than being formed from a single piece of material. The standoff posts 6 consist of a simple combination of space washers 9 and fasteners 10 rather than being formed from the continuous piece of material as was shown in FIG. 5a and 5b. The thickness of the spacer washers 9 determine and control the spacing between rings 7, and the fasteners 10 serve to carry the load between rings 7. The fasteners 10 may be countersunk screws or the like as necessary to provide a low profile between rings 7. This assembled version of the flexure body allows variation of the material between beam flexure rings 7 to allow greater variation of the isolation mounts stiffness characteristics. Flexure rings 7 and standoff posts 6 can be added or subtracted quickly and easily to provide flexibility and adaptability at the installation site.

The VEM layer 3 and associated stiff constraining layer 4 can be applied in segments to all or part of both the outer and inner cylindrical surfaces of the cylindrical flexure. A preferred embodiment is of four one-quarter cylinder sections of VEM and attached constraining layer as shown in FIG. 2 that are sized to conform to the outer radius and height of the cylindrical flexure body 2.

The scope of the invention includes all modifications, design variations, combinations, and equivalents that would be apparent to persons skilled in this art, and the preceding description of the invention and its preferred embodiments is not to be construed as exclusive of such.

We claim:
1. A passive, mtilti-axis, highly damped, shock load isolation mounting device comprising:
   a flexure body comprised of one or more walls of high strength, linear elastic material, wherein in the wall(s) of the flexure body are constructed of multiple beam flexures, and wherein the top and bottom surfaces of the walls of the flexure body have means for attachment;
   a viscoelastic material (VEM) layer attached to at least a portion of one of the surfaces of the wall(s) of the flexure body such that at least two beam flexures are in direct contact with the VEM layer;
   and a stiff constraining layer attached to the surface of the VEM layer opposite to the VEM surface attached to the flexure body.
2. The device of claim 1, wherein the flexure body has multiple walls forming a closed polygon shaped ring.
3. A passive, multi-axis, highly damped, shock load isolation mounting device comprising:
   a cylindrical flexure body comprised of an annular wall of high strength, linear elastic material, wherein in the wall of the cylindrical flexure body are constructed multiple parallel beam flexures and wherein the surfaces at each longitudinal end of the cylindrical flexure body have means for attachment;
   a viscoelastic material (VEM) layer attached to at least a portion of one of the cylindrical surfaces of the cylindrical flexure body such that at least two parallel beam flexures are in direct contact with the VEM layer;
   and a stiff constraining layer attached to the surface of the VEM layer opposite to the VEM surface attached to the flexure body.
4. The device of claim 3 wherein the multiple parallel beam flexures are arranged such that the beam flexures are layered and arrayed in opposing pairs and the pairs are adjoined end-to-end forming a continuous ring of opposing pairs of beam flexures around the circumference of the cylindrical flexure body, and such that the multiple said rings of opposing pairs of beam flexures are spaced and stacked coaxially upon one another with beam ending points aligned, and such that a first ring of opposing beam pairs is connected to an adjacent second ring of opposing beam pairs with supporting material located between the two rings at the midspan of each of the beam flexures that are adjacent between ring pairs, and such that all remaining rings of opposing beam flexures are thusly connected.
5. The device of claim 3 wherein the multiple parallel beam flexures are arranged such that a lengthy and contorted load path is effected across the cylindrical flexure body.
6. The device of claim 3 wherein the cylindrical flexure body is of one-piece construction comprised of multiple parallel beam flexures machined into the wall of the cylindrical flexure body.
7. The device of claim 3 wherein the cylindrical flexure body is an assembly comprised of multiple parallel rings spaced and stacked coaxially upon one another and wherein each ring is spaced and supported to its neighboring rings by standoff posts around the ring such that the rings and posts effect a continuous ring of beam flexures and such that the rings of beam flexures are layered and arrayed in opposed pairs.
8. The device of claim 7 wherein the multiple parallel rings are of varying materials.
9. The device of claim 7 wherein each standoff post consists of a combination of a spacer washer and a fastener, and wherein the fastener is placed through the spacer washer and the two rings spaced by the spacer washer.

10. The device of claim 3 wherein the VEM layer is attached to all the outer cylindrical surface of the cylindrical flexure body, and wherein the stiff constraining layer is attached to all the VEM layer surface opposite the VEM layer surface that is attached to the flexure body.

11. The device of claim 3 wherein the VEM layer is attached to all of both the inner and outer cylindrical surfaces of the cylindrical flexure body, and wherein the stiff constraining layer is attached to all the VEM layer surface opposite the VEM layer surface that is attached to the flexure body.

12. The device of claim 3 wherein the cylindrical flexure body is comprised of multiple parallel beam flexures such that the beam flexures are aligned with the longitudinal axis of the cylindrical flexure body.

13. The device of claim 3 wherein the diameter of the cylindrical flexure body is sized to match the diameter of a spacecraft-to-launch vehicle attachment flange.

14. A passive, multi-axis, highly damped, shock load isolation mounting system comprising multiple devices of claim 1 wherein a device is inserted in each retained mounting location between the payload and vehicle.

\* \* \* \* \*